April 1, 1958 G. D. REHKLAU 2,828,961

CAPSTAN DRIVING MEANS FOR MAGNETIC TAPE MACHINE

Filed Sept. 6, 1955 2 Sheets-Sheet 1

INVENTOR.
George D. Rehklau
BY Fehr & Swain
ATTORNEYS

April 1, 1958 G. D. REHKLAU 2,828,961

CAPSTAN DRIVING MEANS FOR MAGNETIC TAPE MACHINE

Filed Sept. 6, 1955 2 Sheets-Sheet 2

INVENTOR.
George D. Rehklau

BY [signature]

ATTORNEYS

United States Patent Office 2,828,961
Patented Apr. 1, 1958

2,828,961

CAPSTAN DRIVING MEANS FOR MAGNETIC TAPE MACHINE

George Daniel Rehklau, Menlo Park, Calif., assignor to Ampex Corporation, Redwood City, Calif., a corporation of California Application September 6, 1955, Serial No. 532,661

3 Claims. (Cl. 271—2.3)

This invention relates generally to apparatus of the magnetic tape type for recording and/or reproducing sound and other signal frequencies. More particularly the invention pertains to means for driving the magnetic tape relative to the magnetic head.

Conventional magnetic tape machines employ turntables serving to carry tape supply and takeup reels. That portion of the tape extending between the reels is engaged by a driving capstan whereby the tape is moved at a constant speed past a magnetic head assembly that includes erase, recording and playback units. An idler serves to press the tape into frictional driving relation with the capstan, and is mechanically connected through linkage with a solenoid of the reciprocating type. A mechanical spring provides the force for urging the idler against the capstan, during normal recording and playback operations. The spring tension is applied when the solenoid is energized. A tape driving means of the type just described is unsatisfactory in certain respects. It is difficult to maintain a constant predetermined pressure between the idler and the capstan, due to reliance upon a mechanical tension spring. The use of a solenoid of the reciprocating type requires that the armature of the solenoid be moved to an extreme or "bottom" position when the solenoid is energized. This requirement calls for proper adjustment of the connecting linkage between the solenoid and the idler, and if the solenoid is not "bottomed" correctly, the arrangement does not provide the desired idler pressure.

In general it is the object of the present invention to provide a simplified tape driving means which eliminates the conventional reciprocating type of solenoid, together with conventional connecting linkage.

Another object of the invention is to provide tape driving means of the above character having novel means for providing a predetermined optimum pressure of the idler against the capstan.

Another object of the invention is to provide a tape driving means as a unitary assembly, including the capstan, the idler, and the means for operating the idler, whereby such an assembly can be readily installed with respect to the top plate or panel of the magnetic tape machine.

Additional objects and feature of the invention will appear from the following description in which the preferred embodiments of the invention have been set forth in detail in conjunction with the accompanying drawings.

Referring to the drawings.

Figures 1, 2:
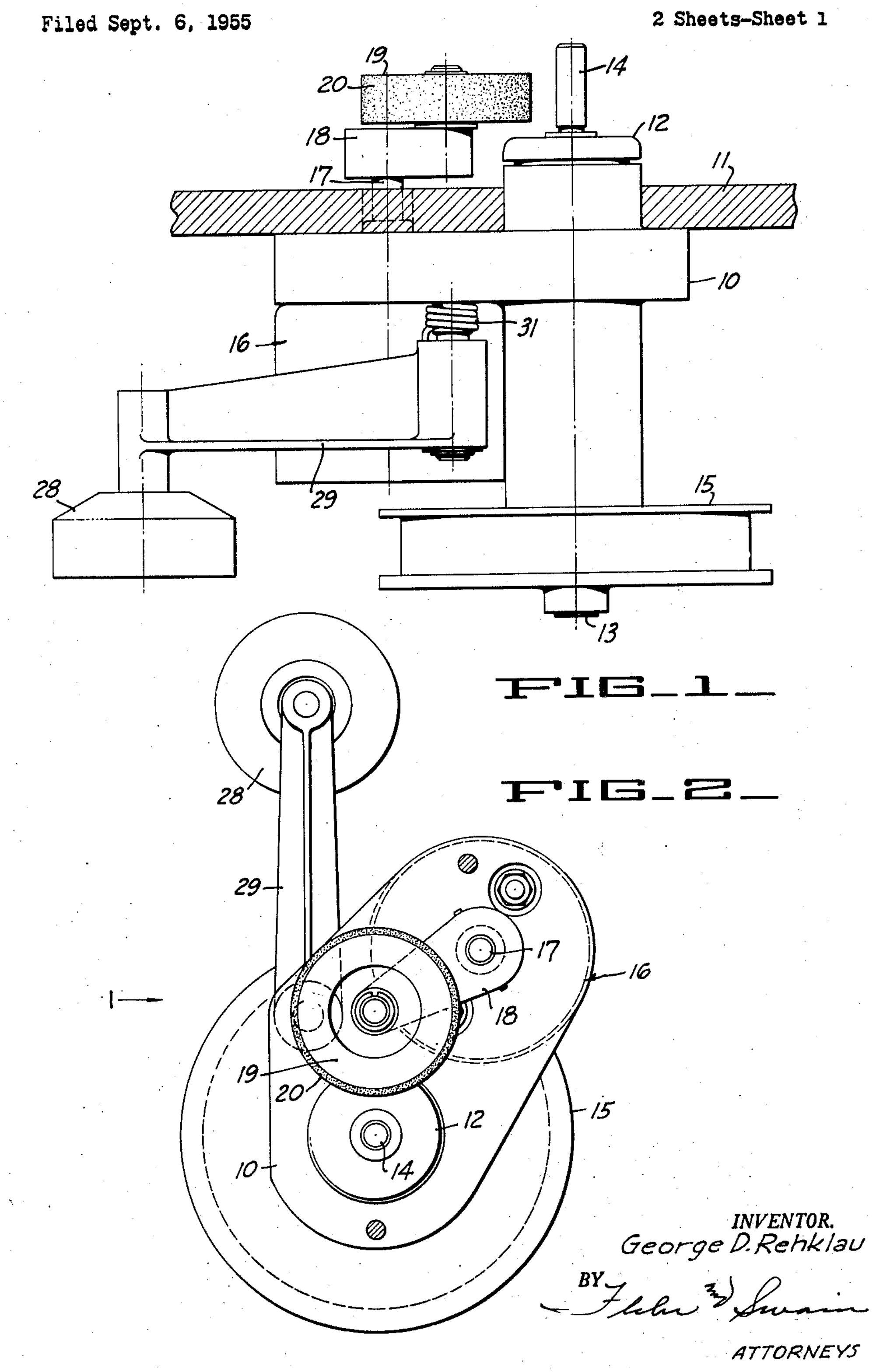
Figure 1 is a side elevational view, partly in section, illustrating a complete unitary assembly in accordance with the present invention.
Figure 2 is a top plan view of the assembly shown in Figure 1.
Figure 3:
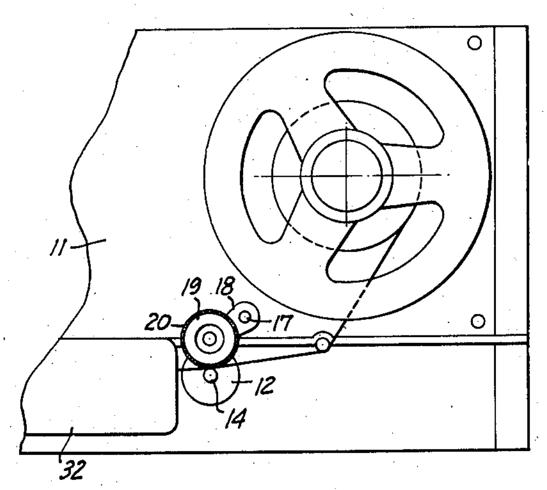
Figure 3 is a plan view schematically illustrating the capstan engaging a magnetic tape on a magnetic tape machine.

The assembly as illustrated in the drawing consists of a mounting member or housing 10 adapted to be secured to the top plate or panel 11 of magnetic tape apparatus. The mounting member carries a journal 12 for a rotatable shaft 13, the upper end 14 of which forms the tape driving capstan. A pulley or sheave 15 is attached to the other end of the shaft, and is adapted to be engaged by a driving belt. As illustrated this sheave may have considerable weight to serve as a fly wheel.

Figure 4:
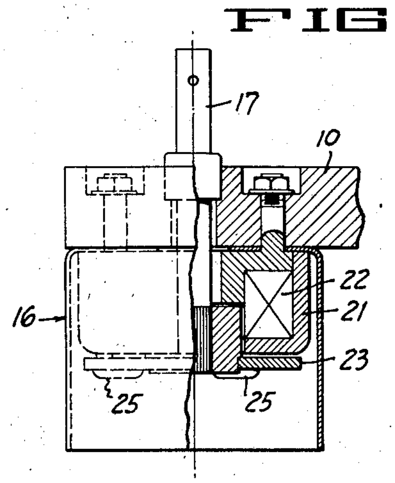
Figure 4 is a cross sectional detail illustrating the rotary solenoid.
Figure 5:
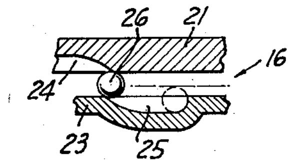
Figure 5 is an enlarged cross sectional detail illustrating cam means incorporated in the solenoid for rotary motion.

A solenoid 16 of the rotary shaft type is mounted upon the member 10, and has its operating shaft 17 extending parallel to the capstan shaft 13. An arm 18 is attached to shaft 17, and free end of this arm carries the idler 19. The idler may have its periphery faced with resilient natural or synthetic rubber 20. The rotary solenoid 16 is constructed whereby when it is energized, its shaft 17 is turned in one direction to urge the idler 19 against the capstan 14. The solenoid also incorporates a suitable return spring whereby when deenergized the shaft 17 is rotated in an opposite direction to a limiting position such as illustrated in Figure 2. A suitable solenoid for this purpose is one sold by G. H. Leland, Dayton, Ohio, under the trade-name of "Ledex." As shown in Figures 4 and 5 it includes a casing 21 surrounding the winding 22 and a so-called armature plate 23. Inclined cam surfaces 24 and 25 are formed respectively upon the casing and the armature plate, and are engaged by the balls 26. When the winding 22 is energized the plate 23 is urged toward the casing 21, and the action of the balls upon the inclined cam surfaces causes rotation of the shaft. For a solenoid of given size and electrical characteristics, and with a predetermined current excitation, it will be evident that the pressure of the idler against the capstan can be a value compatible with optimum driving of the tape.

It is assumed in the foregoing that the capstan shaft is driven by means of a belt (not shown). It will be evident however that in some instances it may be desirable to mount a motor upon the mounting member 10, and connect the same directly (or through suitable speed reduction means) with the capstan shaft. When a belt is employed it is desirable to provide belt tensioning means such as illustrated. It consists in this instance of the belt engaging idler 28 carried by the arm 29. The arm in turn is journaled to the mounting member 10, and is urged in a direction to tension the belt, by means of a spring 31.

The tape driving means described above operates as follows: Normally it is secured to the top plate of a magnetic tape machine, whereby the capstan 14 is in proper alinement with the supply and takeup reels, and with the magnetic head 32 of the machine. The tape after passing the magnetic head passes between the capstan 14 and the idler 19. When the machine is being used for recording or playback operations, the solenoid 16 is energized whereby the idler 19 presses the tape against the driving capstan 14, with a predetermined amount of pressure consistent with optimum tape driving action. The pressure between the idler 19 and the capstan is developed by the torque of the rotary solenoid, and not by the action of a mechanical spring. Therefore this pressure remains the same at all times, thus eliminating all requirement for mechanical adjustments. Since all of the working parts are carried by a common mounting member, which in turn can be attached to the top plate of the machine, the device can be readily installed or removed for servicing or replacement.

I claim:

1. In magnetic tape apparatus, a driving capstan having a peripheral surface for engaging with magnetic tape, an idler roller, a solenoid of the type having an operating shaft that is rotated in one direction when the solenoid is energized, an arm connected to the solenoid shaft, and an idler roller secured to the free end of the arm and adapted to urge the tape against the driving capstan when the shaft is rotated in said one direction.

2. In magnetic tape apparatus, a driving capstan having a peripheral surface for engaging with magnetic tape, a solenoid of the type having an operating shaft that is rotated in one direction when the solenoid is energized, an arm directly attached to the solenoid shaft, an idler roller journaled to the free end of the arm, said roller being disposed to press the tape against the driving capstan when the solenoid is energized and being retracted when the solenoid is deenergized.

3. In magnetic tape apparatus, a mounting member, a shaft journaled to the mounting member and having a tape driving capstan on one end of the same, a solenoid of the type having an operating shaft that is rotated in one direction when the solenoid is energized, said solenoid being attached to said mounting member, an arm directly attached to the shaft of the solenoid, and an idler journaled to the free end of said arm, said idler being disposed to press the tape against the driving capstan when the solenoid is energized.

References Cited in the file of this patent

UNITED STATES PATENTS

| | | |
|---|---|---|
| 2,442,853 | Lauder et al. | June 8, 1948 |
| 2,704,639 | Shields | Mar. 22, 1955 |